May 2, 1950            J. S. EDISON            2,505,887
CONTROL FOR FLUID PRESSURE ACTUATED DEVICES
Filed Dec. 11, 1944            3 Sheets-Sheet 3
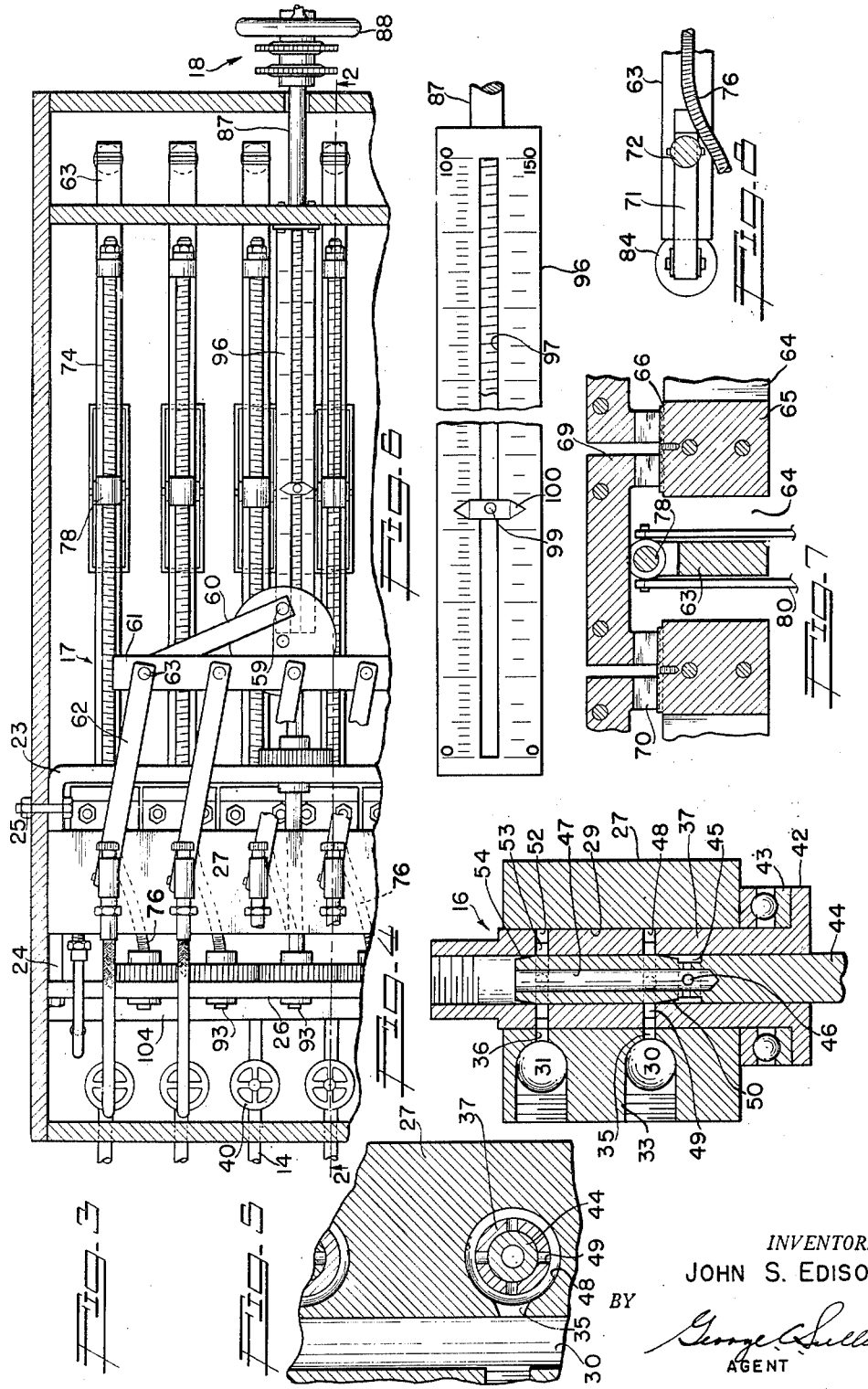
*INVENTOR.*
JOHN S. EDISON
BY
George A. Sullivan
AGENT Patented May 2, 1950

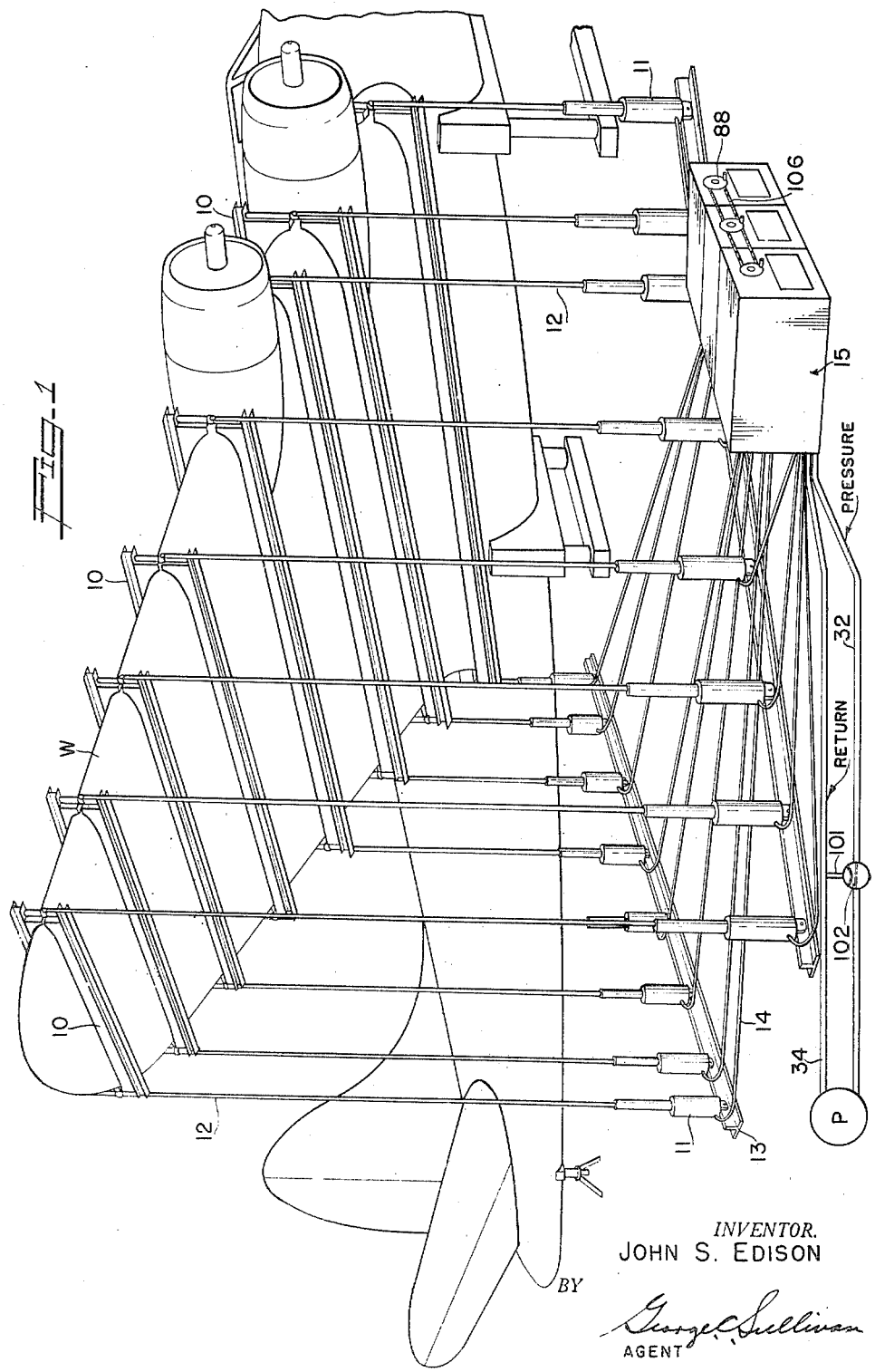

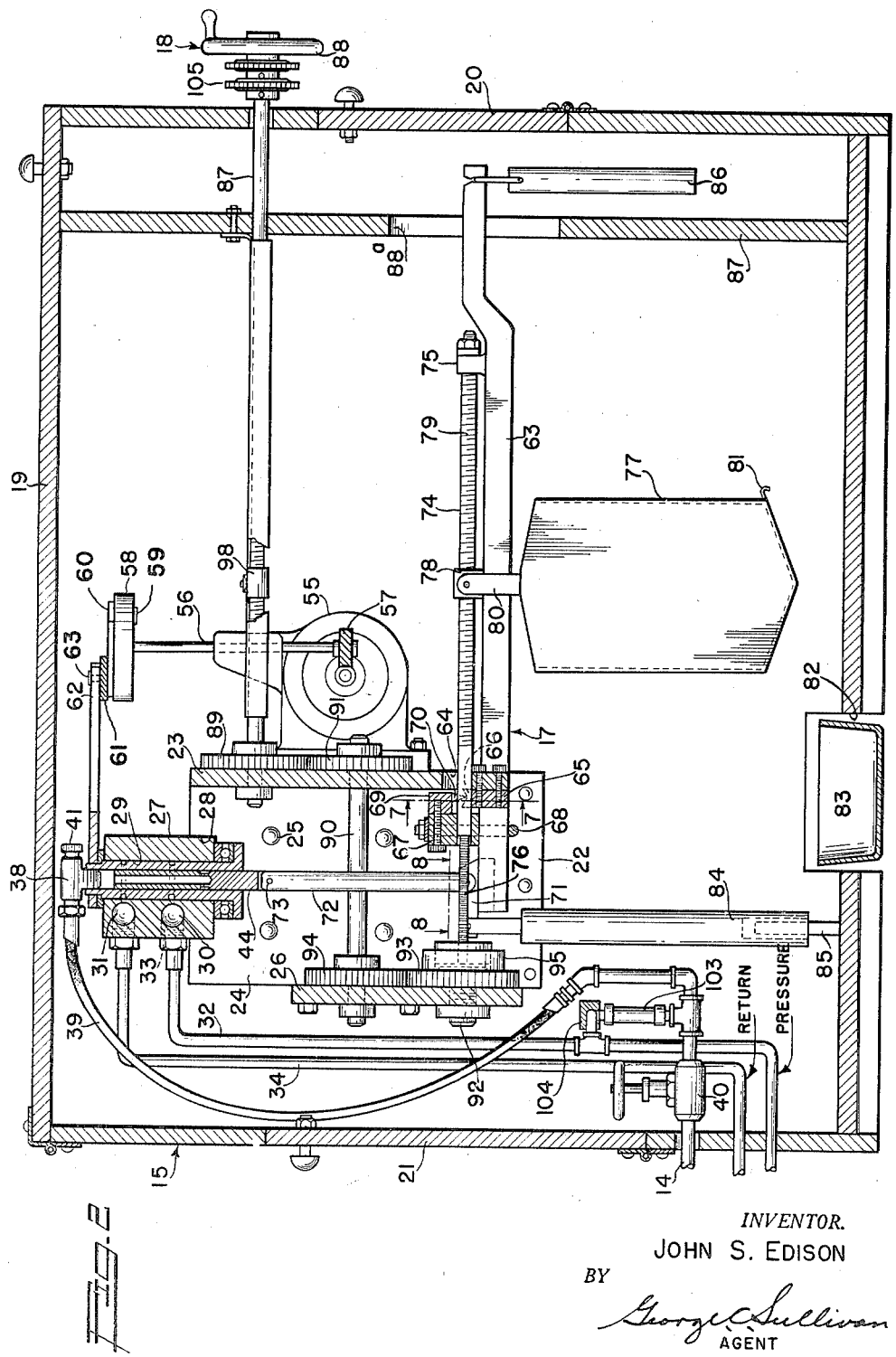

2,505,887

UNITED STATES PATENT OFFICE 2,505,887

CONTROL FOR FLUID-PRESSURE ACTUATED DEVICES

John S. Edison, Burbank, Calif., assignor to Lockheed Aircraft Corporation, Burbank, Calif.

Application December 11, 1944, Serial No. 567,759

13 Claims. (Cl. 137—144)

This invention relates to fluid pressure control mechanisms, and relates more particularly to mechanisms for controlling pluralities of fluid actuated units or devices.

In the static testing of airplanes and aircraft components, it is desirable to impose loads at spaced stations of the structure being tested. The loads at the spaced stations are usually of different values, and it is desirable to increase the load values while maintaining a given ratio between the loads at the various load stations. The loads should be gradually increased simultaneously so that the behavior of the structure may be observed under known or predetermined conditions. Hydraulic jacks and levers are often employed to impose the test loads. It is practically impossible to gradually increase the loads at several stations with such equipment while maintaining a given relationship or ratio between the imposed loads at the spaced points of loading. Furthermore, such arrangements are expensive to put into condition for use and require the attendance of a large number of operators throughout the test. Valve devices known as load maintainers have been introduced to maintain a given fluid pressure at related jacks. It is necessary to provide a load maintainer for each jack, or for each series of jacks intended to impose a given load, and to individually control each load maintainer by means of a lever and weight pan combination. To change the pressure being supplied to a given jack, or a given set of jacks, it is necessary to alter the weight in the weight pan of the respective load maintainer. Where a multiplicity of jacks is employed at stations where different loads are to be exerted, it is extremely difficult to simultaneously vary the weights at the several load maintainers, even when a large number of operators are at hand to perform the operations. Furthermore, the valve devices or load maintainers become unstable and produce surges in the lines leading to the jacks, when weight is added to the weight pans. The surging in the pressure lines is imposed on the jacks with undesirable results.

It is an object of the invention to provide a unitary device or mechanism for controlling a multiplicity of fluid pressure actuated jacks, or similar units, supplied by a single pump or fluid pressure source, and operable to simultaneously vary the pressures delivered to the jacks while preserving a given relationship or ratio between the pressures at the several jacks. The mechanism is such that a given ratio may be established between the initial pressures supplied to certain controlled units or jacks, and thereafter a single attendant or operator may easily regulate the device to simultaneously increase or decrease the pressures supplied to the jacks while preserving the given ratio. The device being in the form of a single unit, materially reduces the set-up time and the installing of separate levers, weight pans, and the like, for the individual valve devices is entirely avoided. Furthermore, there is no need to provide complicated lever arrangements because the controlled jacks may directly act on the jigs through the medium of extensions on the jack plungers. The single operator of the mechanism may readily perform the functions of the many operators heretofore required and with far superior results.

Another object of the invention is to provide a mechanism of the character referred to which maintains steady pressures on the several controlled devices or jacks at all times. There is no instability of the valves or surging in the lines during the simultaneous increase or reduction of the supplied fluid pressures, or while constant pressures are being maintained. In the mechanism of the invention there is no need to periodically add shot or other weight material to the weight pans in order to increase the fluid pressures supplied to the jacks, and there need be no sudden fluctuations in the supplied pressures. Furthermore, the valve mechanisms of the invention insure smooth, surgeless variations in the pressures, even though the pressures may be altered quite suddenly.

Another object of the invention is to provide a mechanism of the character referred to which is immediately responsive to control by a single operator. When the attendant or operator manipulates the single control lever, or hand wheel, the pressures imposed on the several remote jacks are simultaneously increased or decreased as the case may be, while maintaining the preselected ratio between the several pressures. The mechanism is accurate in supplying the selected pressure to the plurality of jacks during stable periods as well as during periods of variation. The single control means and the improved valve mechanisms assure smooth jack operation without surges or instability when the mechanism is operated to alter the supplied pressures.

Another object of the invention is to provide a mechanism of the character mentioned in which the fluid pressure leakage at the jacks or in the lines leading to the jacks is automatically compensated for by the valve means, and in the event of failure or sudden relaxation of any part of the structure being tested, the pressure is automatically relieved at all of the associated jacks.

A further object of the invention is to provide a mechanism of the class referred to embodying improved valve means sensitive to extremely small variations in the control weights and to minor adjustments of the control mechanism.

A still further object of the invention is to proof operated weight beam means 17 and other parts, the details of which will be later described.

The heads of shafts 14 may be of any desired construction.

the openings 29. It is to be understood that a pair of vertically spaced ports 35 and 36 communicates with each opening 29.

Each valve means 16 includes a sleeve 37 rotatably engaged in its respective opening 29 of the manifold. The sleeve 37 extends completely through the manifold 27, and its upper end carries a fitting 38. A flexible conduit 39 extends from the fitting 38 to a suitable high pressure shut-off valve 40. The related jack line 14 extends from the shut-off valve 40, or from a suitable quick disconnect fitting adjacent the valve. The fitting 38 at the upper end of the valve sleeve 37 may have a removable plug closure 41 to facilitate ready testing of the fluid pressure being supplied to the related jack or jacks 11. As will later become apparent, the fluid pressures in the valve mechanism tend to urge the valve sleeve 37 upwardly. The portion of the sleeve 37 projecting below the manifold 27 carries a flange 42 and an anti-friction bearing 43 is engaged between the flange and the lower side of the manifold to insure free angular movement of the sleeve when the valve is under pressure.

Each valve 16 further includes a plunger 44 movable axially in the sleeve 37. The plunger enters the lower end of the sleeve and is connected with a weight beam mechanism 17 as will be later described. The plunger 44 extends upwardly in the sleeve 37 to a point above the plane occupied by the port 36 in the manifold 27. The sleeve 37 and plunger 44 have a system of ports whereby the axial position of the plunger 44 determines the fluid pressure being supplied to the related jack line 39. An annular external groove 45 is provided in the plunger 44 to be in a plane below the plane occupied by the port 35 of the manifold. A series of spaced radial ports 46 is provided in the wall of the plunger 44 to connect the groove 45 with an axial opening 47 in the plunger. The opening 47 leads upwardly to the upper end of the plunger where it communicates with the interior of the sleeve 37. An annular external groove 48 is provided in the sleeve 37 and registers with the manifold port 35 to receive fluid pressure therefrom. Spaced radial ports 49 extend inwardly from the groove 48 to the interior of the sleeve. The ports 49 are relatively small in fluid capacity and are controlled by the plunger 44 so that there is never large-volume flow from the manifold port 35. In accordance with the invention, the surface 50 of the plunger 44 directly above the groove 45 tapers downwardly and inwardly to the groove. The degree of taper of this surface 50 is preferably quite small, the taper being exaggerated in the drawings for illustrative purposes. The tapered surface 50 and the cylindrical surface of the plunger 44, extending upwardly therefrom, control the pressure supply ports 49. In certain positions of the plunger 44, the upper extremity of the tapered surface 50 is adjacent the lower extremities of the ports 49 to permit only very slight communication between the pressure supply ports 49 and the groove 45. In other positions of the plunger 44, the lower portions of the tapered surface 50 oppose the ports 49 so that there is relatively substantial communication between the pressure supply ports 49 and the groove 45. It will be observed that axial movement of the plunger 44 results in a gradual variation in the extent of communication between the pressure supply ports 49 and the groove 45. The construction just described is such that even substantial and relatively sudden motion of the plunger 44 produces only gradual and minor variations in the extent of communication of the pressure supply ports 49 with the jack line 39.

The port system of the valve 16 further includes an annular groove 52 in the exterior of the sleeve 37 communicating with the return port 36 of the manifold 27. Spaced radial ports 53 of relatively small diameter extend inwardly through the sleeve 37 from the groove 52. The ports 53 are preferably of the same aggregate capacity as the ports 49. The exterior of the plunger 44 has a surface 54 tapering downwardly and outwardly. The surface 54 extends to the upper end of the plunger and is positioned to control the ports 53. In certain positions of the plunger 44 the lower portion of the surface 54 is adjacent the upper extremities of the return ports 53 so that there is little or no communication between the return ports and the jack line 39. In other positions of the plunger the upper portions of the tapered surface 54 oppose the return ports 53 providing relatively large communication between the return ports 53 and the jack line. The pressure ports 49 and return ports 53 are preferably of the same capacity and the surfaces 50 and 54 are of the same length and have the same taper. It will be observed that upon movement of the plunger 44 in the upward direction, the communication of the pressure supply ports 49 with the jack line 39 is increased and communication between the return ports 53 and the jack line is diminished. Conversely, when the plunger 44 moves downwardly, communication between the pressure ports 49 and the jack line 39 is diminished and communication between the return ports 53 and the jack line is enlarged. The valve structure just described has been found to be smooth working and does not become unstable to cause surges or fluctuations in the pressure lines.

The invention preferably includes means for rotating or oscillating the sleeves 37 of the several valve means 16 to keep the valves free and thus assure their full immediate responsiveness. The sleeve rotating means includes an electric motor 55 mounted on the forward face of the support member 23. A vertical shaft 56 extends upwardly from adjacent the motor 55 and a suitable speed reducing drive 57 connects the vertical shaft with the horizontal motor shaft. The upper end of the shaft 56 carries a disc 58 provided with an eccentric pin 59. A crank rod 60 is pivotally arranged on the pin 59 and extends to a horizontal link or connecting bar 61. Individual links 62 are pivoted to the bar 61 at 63 and extend to the sleeves 37 of their respective valves 16. The end portions of the links 62 may be split and clamped onto the upper ends of the sleeves 37 to be rigid therewith. It will be seen that when the motor 55 is in operation the sleeves 37 of all of the valves 16 are oscillated continuously to assure full freedom of movement of the valve plungers 44. The constantly oscillating sleeves 37 prevent even minor sticking of the plungers and reduce friction and resistance to plunger movement.

The weight beam means 17 are provided to operate or control the plungers 44 of the valves 16. The several means 17 may be identical and I will proceed with a description of one of them, it being understood that this description applies to all of the several beam mechanisms. Each beam means 17 includes an elongate lever or beam 63 pivotally supported between its ends on the support member 23. The beam freely passes through a notch or opening 64 in the member 23 and knife edge bearing means are provided at the notch to support the beam for free pivotal movement. Blocks 65 are secured to the member 23 adjacent the opening 64 and have V troughs or channels 66 in their upper sides. A carrier 67 is secured to the beam 63 by a U bolt 68, or the equivalent, and supports a hardened block 69. The block 69 has downwardly facing knife edge parts 70 for riding in the grooves 66. The blocks 65 and 69 are accurately machined and hardened to be long wearing and to operate with a minimum of friction.

The short rear arm of the beam 63 is operatively connected with the plunger 44 of the related valve 16. A blade 71 is secured in a slot in the beam 63 to project from the upper side of the beam. A connecting rod 72 is pivotally secured to the blade 71 and extends upwardly for connection with the valve plunger 44. A suitable pivotal connection 73 is provided between the connecting rod 72 and the lower end of the plunger 44.

The beam 63 carries a rotatable shaft 74. The outer or forward end of the shaft 74 is supported by a suitable bearing 75 on the beam 63, while the other end portion of the shaft is rotatably supported in an opening in the above described carrier 67. The shaft 74 extends along the upper side of the beam 63. As best illustrated in Figure 8, a flexible shaft 76 is connected with the shaft 74 and extends rearwardly past the blade 71 and connecting rod 72. The flexible shaft 76 is operatively connected with the manually operable control means 18 to be rotated thereby as will be later described.

Rotation of the beam shafts 74 and 76 moves or adjusts a weight pan 77. The weight pan is suspended from a traveling nut 78 cooperating with a long thread 79 on the beam 74. Straps 80 on the upper end of the weight pan 77 pass upwardly at opposite sides of the beam 63. The nut 78 may have a flat surface riding on the upper face of the beam to hold the nut against rotation when the shaft is operated and to transfer the weight to the beam. It will be observed that the weight pan 77 is carried by the long arm of the beam 63. The pan 77 is movable, by its traveling nut 78, between a zero pressure position where the nut is adjacent the support member 23 and a full pressure position where the nut is adjacent the bearing 75. The upper end of the pan 77 is open to receive lead shot, or other weight material, and a slidable closure 81 is provided for the bottom of the pan to facilitate removal of the weight material. The end walls of the housing 10 are notched out and a slot 82 is provided in the bottom wall to receive an elongate tray 83. When the weight pans 77 of the several beam means 17 are brought to the zero pressure positions the closures 81 may be opened to allow the weight material to discharge into the tray. Thus the several pans may be speedily emptied at the end of each test.

It will be observed that the plunger 44 of each of the above described valves 16 is urged downwardly by the static fluid pressure in the upper portion of the sleeve 37. This pressure imposed on the plunger is representative of and substantially identical with the pressure supplied to the related jack or jacks 11. The fluid pressure imposed on the plunger 44 is transmitted by the connecting rod 72 to the short arm of the beam 63. The axial position of the plunger 44 determines the pressure supplied to the related jack or jacks 11, and when the weight beam overcomes the hydraulic pressure on the plunger, the plunger is moved upwardly to increase the pressure being supplied to the jacks. Conversely, when the static pressure in the sleeve 37 overcomes the weighted beam 63, the plunger is moved downwardly to reduce the pressure being supplied to the jack or jacks. Thus it will be seen that the effective weight applied to the pivoted beam 63 and the axial position of the weight on the beam are critical in determining and maintaining a given pressure at the related jacks 11.

Counterbalance means may be provided to bring the beam assembly into a state of equilibrium before the addition of weights to the pan 77. I have shown a counterweight 84 suspended from the short arm of the beam 63 and guided by a rod 85 projecting from the bottom wall of the housing. The weight 84 counterbalances the pan 77, shaft 74, etc., and in practice, may accurately balance the beam assembly to be sensitive to minor alterations in weight in the pan 77 and to minor variations in the position of the pan. If desired, the beam 63 may also be equipped with weight means to compensate for the weight of the related jigs 10, friction at the jacks 11, etc. I have shown a weight 86 removably engaged on the forward end portion of the beam 63. The weight 86 is contained in a space between the forward housing wall and a partition 187 in the housing. The weight 86 compensates for a constant load such as the weight of the related jigs, friction at the related jacks, etc., while the test load may be varied from zero to any selected load by means of the movable weight pan arrangement. A slot 88a in the partition passes the beam 63 and supports and guides the beam against lateral displacement. The above described beam assembly is mounted for movement with a minimum of friction and is sensitive to very slight variations in the fluid pressures imposed on the valve plunger 44 and to slight alterations in the position of the weight pan 77.

The manually operable control means 18 is provided to facilitate simultaneous adjustment or movement of the several weight pans 77 along their respective beams 63 and thus simultaneously control the pressures being supplied to the several jacks 11. In accordance with the invention, the control means 18 is such that it may be manipulated by a single operator to effect slight or great changes in the active jack pressure as conditions may require. The means 18 includes a shaft 87 extending through horizontal openings in the front wall and partition 187 of the housing. The shaft 87 is suitably supported for rotation by the partition 187 and support member 23. The control shaft 87 is spaced above the series of beams 67 and may be substantially midway between the sides of the housing. The shaft 87 preferably occupies a vertical plane offset from the vertical planes occupied by the adjacent beams 63 and shafts 74. A hand wheel 88, or the equivalent, is fixed to the forward end of the shaft to facilitate its manual rotation. A gear 89 is secured to the shaft 87 adjacent the support 23. A second horizontal shaft 90 is rotatably supported in openings in the members 23 and 26 and a gear 91 fixed to this shaft meshes with the gear 89.

The control means 18 further includes stub shafts or trunnions 92 secured to the support member 26 to be offset with respect to their respective beam shafts 74. Gears or pinions 93 are rotatable on the trunnions 92 and the pinions of the adjacent trunnions mesh one with the other. A gear 94 is fixed to the shaft 90 adjacent the support member 26 and meshes with one of the pinions 93. It will be seen that upon rotation of the shaft 87 all of the pinions 93 are rotated. The flexible shafts 76 of the beams 63 are connected with their respective pinions 93 so that upon operation of the hand wheel 88 the threaded shafts 74 will be rotated to move the weight pans 77. The rear ends of the flexible shafts 76 are anchored in blocks 95 fixed to the pinions 93. The threads 79 of the beam shafts 74 are pitched in alternate directions; that is, the thread of the first shaft is a right hand thread, the thread of the second shaft has a left hand pitch, the thread of the third shaft has a right hand pitch, and so on. This relationship assures simultaneous movement of the weight pans 77 in the same direction upon rotation of the hand wheel 88. The threads 79 of the shafts 74 have an equal lead so that a given angular movement of the hand wheel 88 is reflected in simultaneous equal movements of the weight pans 77.

Scale means may be provided to indicate the value of the pressures being supplied to the jacks 11. A horizontal scale member 96 is secured to the partition 87 and has a longitudinal slot 97 directly above the control shaft 87. The shaft 87 carries a long thread and a traveling nut 98 cooperates therewith. A pin 99 on the nut 98 travels through the slot 97. Suitable calibrations or scales may be provided on the upper surface of the member 96 at opposite sides of the slot 97. In Figure 6, I have shown two scales. One scale may be termed the ultimate load scale, and the other may be considered as the limit load scale. A double ended pointer 100 is secured to the pin 99 to simultaneously cooperate with the two scales. It will be apparent how the pointer 100 indicates the axial disposition of the weight pans 77 and thus indicates the general value of the pressures being supplied to the jacks 11.

Valve means may be provided to simultaneously relieve the fluid pressure imposed on the several jacks 11 in the event of sudden failure of a part or section of the wing W or other structure being tested. As illustrated diagrammatically in Figure 1, a connecting or by-pass line 101 extends between the pump pressure line 32 and the return line 34. A two-way valve 102 controls communication between the by-pass line 101 and the pressure line 32. The valve 102 is movable between a position where fluid under pressure is free to flow through the line 32 from the pump P to the control mechanism and a position where the pressure line and return line 34 are connected to relieve the mechanisms and the jacks 11 of fluid pressure. The valve 102 may be manually operated or may be controlled by a suitable remote control means. The two-way valve 102 is normally in the position illustrated, but in the event it is desired to relieve pressure at all of the jacks 11, the valve is moved to its other position. Spring loaded check valves 103 are connected between the pumping pressure line 32 and the lines 39 leading from the valve means 16. An elongate manifold 104 has communication with the pressure line 32. The check valves 103 are connected in the lines 39 and all have communication with the manifold 104; see Figure 2. The valves 103 are normally held closed by the pressure from the pump P. When the two-way valve 102 is moved to the position to place the pressure line 32 in communication with the return line 34, the pressure in the line 32 drops and the check valves 103 open to unload the valves 16. Thus the check valves assure rapid simultaneous unloading of pressure from the valves 16 and the jacks 11.

In the use or operation of the mechanism, the jigs 10 are arranged at the selected stations along the wing W, and the jacks 11 are secured to the beams 13 in positions where their plunger extensions 12 may be properly connected with the jigs. The lines 14 are connected between the jacks or sets of jacks and the valves 40 of the mechanisms. Several lines 14 may be connected with each valve 40 so that a series of jacks will be under the control of a single valve means 16, or the lines 14 may be arranged so that each jack is governed by an individual valve 16. Where there is a large number of jacks 11 to be supplied with pressures of different values it may be necessary to employ two or more control mechanisms of the invention. For example, where each mechanism embodies ten valves 16 and it is necessary to provide thirty jacks 11 with pressures of different values, three units or mechanisms of the invention may be employed. In accordance with the invention the plurality of mechanisms may be inter-connected for simultaneous control. Figure 1 shows three such inter-connected mechanisms. Sprockets 105 are fixed to the shafts 87 of the mechanisms and chains 106 operate over the sprockets. One to one drives are provided between the sprockets 105 so that the movement at the three mechanisms is equal.

In preparing the apparatus for use, the covers 19 are raised to expose the internal parts. Lead shot or other weight medium, is then introduced into the weight pans 77. The weight is weighed as it is supplied to the pans and any selected ratio or relationship of weights may be provided between the several beam units of the mechanism or mechanisms to obtain a selected ratio between the fluid pressures to be supplied to the jacks 11. In this connection it is to be understood that when a selected ratio of weights has been obtained in the pans 77 before starting the actual test it is unnecessary to alter the weights, and the original ratio is maintained throughout the test. With the valves 40 open and the pump P and motor 55 in operation, the mechanisms are conditioned for the test. The hand wheel 88 may be rotated to bring the weight pans 77 to selected positions for the start of the test. As above described, the means 18 provides for simultaneous movement of the pans 77 to corresponding positions along the beams 63. Adjustment of the pans 77 is reflected in movement of the plungers 44 of the valves 16. The pointer 100, operating along the scales, indicates the positions of the pans 77 and the value of the pressures being supplied to the jacks 11. To simultaneously increase the loads imposed on the wing structure by the jacks 11, the hand wheel 88 is merely rotated to advance the pans along the beams 63. The test loads are increased in the predetermined ratio as established by the weights in the pans 77. It is to be observed that the simultaneous regulation of the plurality of jacks 11 is accomplished by one operator manipulating the hand wheel 88. The test loads may be increased gradually, continuously or intermittently, and at any rate desired. The load values imposed on the wing W may be readily and accurately determined at any time by referring to the pointer 100 operating over the scales.

The improved valve means 16 respond to regulation or adjustment without oscillation or instability. The continuously oscillating sleeves 37 prevent the valves from sticking and assure smooth plunger movement. Any leakage at the valves 16, lines 14 or jacks 11 is automatically compensated for by the valve plungers 44 which are balanced between the pressures existing in the jack lines and the weighted beams 63. The test may be carried on to completion without adding to or subtracting from the weights in the pans 77 and without adjustment or regulation of any parts except the single hand wheel 88. At the completion of the test the several valves 40 are closed and the lines 14 may be disconnected. The weight pans 71 may be restored to the normal pressure conditions so that their closures 81 can be opened to discharge the weight material into the pan 83.

Having described only typical forms of the invention, I do not wish to be limited to the specific details herein set forth, but wish to reserve to myself any variations or modifications that may appear to those skilled in the art or fall within the scope of the following claims.

I claim:

1. In a system for controlling the delivery of fluid pressure to a plurality of lines the combination of a source of fluid pressure, a valve means for each line operable to control the pressure supplied thereto from said source, each valve means including a part urged in one direction by the pressure from said source and movable to vary the fluid pressure supplied to the related line, and control means for the valves comprising a lever mechanism for moving each of said parts in the direction opposite to the first named direction, means for conditioning each of said mechanisms to give its respective valve part an initial setting, and means operatively mechanically connected with the several lever mechanisms for simultaneously operating said mechanisms to move their respective valve parts to vary the pressures supplied to the related lines while maintaining the ratio between said pressures as established by said initial settings of said valve parts.

2. In a system for controlling the delivery of fluid pressure to a plurality of lines the combination of a source of fluid pressure, a valve means for controlling the pressure supplied each line from said source, each valve means including a part movable to vary the pressure supplied to the related line, and control means for the valves comprising a mechanism for moving each of said parts, each mechanism including an adjustable weight, means for giving its respective valve part an initial setting, and means for simultaneously operating said mechanisms to adjust their weight means and thereby move their respective valve parts to vary the pressures supplied to the related lines while maintaining the ratio between said pressures, the last named means including a manual operating member manipulable to operate said mechanisms.

3. In a system for controlling the delivery of fluid pressure to a plurality of lines the combination of a source of fluid pressure, a valve means for each line operable to control the pressure supplied thereto from said source, each valve means including a part movable to vary the pressure supplied to the related line, said parts being urged in one direction by the fluid pressure supplied to their respective lines, and control means for the valves comprising a mechanism for each valve operable to urge its said part in the opposite direction, variable weight means for conditioning each mechanism to give the related valve part an initial setting, and means operable to simultaneously operate said weight mechanisms to move said valve parts and thus vary the pressures supplied to said lines while maintaining the ratio between said pressures as determined by the initial settings of said valve parts.

4. In a system of the character described the combination of a source of actuating fluid pressure, lines for conducting actuating pressure from said source, valves for governing the delivery of pressure from said source to said lines, each valve including a part movable to control said delivery of pressure and urged in a direction to reduce said delivery by the pressure in said line, a variable gravity actuated mechanism associated with each valve operable to urge the valve part in a direction to increase said delivery, means for conditioning said mechanisms to give their related valve parts a given setting, and control means for regulating said mechanisms to simultaneously increase or decrease the pressures supplied to said lines while maintaining the ratio between said pressures as determined by said conditioning means.

5. In a system of the character described the combination of a source of actuating fluid pressure, lines for conducting actuating pressure from said source, valves for governing the delivery of pressure from said source to said lines, each valve including a part movable to control said delivery of pressure and urged in a direction to reduce said delivery by the pressure in said line, lever means associated with each valve operable to urge its valve part in a direction to increase said delivery, weight receiving means on each lever means adapted to receive a selected weight to give the related valve part a given setting, and a control operable to simultaneously vary the influence of said weights upon their respective valve parts to vary the pressures supplied to said lines while maintaining the ratio of pressures as determined by the selected weights.

6. In a system of the character described the combination of a source of actuating fluid pressure, lines for conducting actuating pressure from said source, valves for governing the delivery of pressure from said source to said lines, each valve including a part movable to control said delivery of pressure and urged in a direction to reduce said delivery by the pressure in said line, a pivoted beam associated with each valve operable to urge said part thereof in a direction to increase the delivery of pressure, weight carrying means movable along each beam and adapted to receive a selected weight, the weights initially supplied to said carrying means serving to establish a given ratio between the fluid pressures supplied to the lines, and means for simultaneously moving said carrying means to simultaneously vary the pressures supplied to the several lines while maintaining said ratio of pressures.

7. In a system of the character described the combination of a source of actuating fluid pressure, lines for conducting fluid pressure from said source, valves for governing the delivery of pressure from said source to said lines, each valve including a part movable to control said delivery of pressure in said line, a pivoted beam associated with each valve operable to urge said part thereof in a direction to increase the delivery of pressure, weight carrying means movable along each beam and adapted to receive a selected weight, the weights initially supplied to said carrying means serving to establish a given ratio between the fluid pressures supplied to the lines, and a single manually operable means for simultaneously moving said carrying means an equal distance to simultaneously vary the pressures supplied on the several lines while maintaining said ratio of pressures.

8. In a mechanism for controlling a system having a plurality of fluid pressure supply lines, the combination of a source of fluid pressure, manifold means in communication with said source, a valve means associated with the manifold means for controlling the communication of said source with said lines, each valve means including a part movable in response to pressure in the related line and operable to control said pressure, a pivoted beam operatively connected with each valve part and operable to balance its respective part against said pressure in the line, weight carrying means movable along each beam, the weights initially supplied to the carrying means serving to establish a given ratio between the pressures supplied to the lines, and means for simultaneously moving said carrying means along their beams to vary said pressures while preserving said ratio.

9. In a mechanism for controlling a system having a plurality of fluid pressure supply lines, the combination of a source of fluid pressure, manifold means in communication with said source, valve means associated with the manifold means for controlling the communication of said source with said lines, each valve means including a part movable in response to pressure in the related line and operable to control said pressure, and a sleeve carrying said part for movement and supported by said manifold means for rotation, means for rotating the sleeves of the several valve means, a pivoted beam operatively connected with each valve part and operable to balance its respective part against said pressure in the line, weight carrying means movable along each beam, the weights initially supplied to the carrying means serving to establish a given ratio between the pressures supplied to the lines, and means for simultaneously moving said carrying means along their beams to vary said pressures while preserving said ratio.

10. In a mechanism for controlling a system having a plurality of fluid pressure supply lines, the combination of a source of fluid pressure, manifold means in communication with said source, valve means associated with the manifold means for controlling the communication of said source with said lines, each valve means including a part movable in response to pressure in the related line and operable to control said pressure, a rotatable sleeve around the valve part, and means for rotating the sleeve to keep said parts free for movement, a pivoted beam operatively connected with each valve part and operable to balance its respective part against said pressure in the line, weight carrying means movable along each beam, the weights initially supplied to the carrying means serving to establish a given ratio between the pressures supplied to the lines, and means for simultaneously moving said carrying means along their respective beams to vary said pressures while preserving said ratio.

11. A mechanism for controlling the delivery of fluid pressure to a plurality of lines comprising a source of fluid pressure, manifold means in communication with said source, valve means associated with the manifold means for controlling the communication of said source with said lines, each valve means including a part movable in response to pressure in the related line and operable to control said pressure, a pivoted beam operatively connected with each valve part and operable to balance its respective part against said pressure in the line, weight carrying means movable along each beam, the weights initially supplied to the carrying means serving to establish a given ratio between the pressures supplied to the lines, scale means for indicating the positions of the carrying means, and means for simultaneously moving said carrying means along their beams to vary said pressures while preserving said ratio.

12. A mechanism for controlling the delivery of fluid pressure to a plurality of supply lines comprising a source of fluid pressure, manifold means in communication with said source, a valve means associated with the manifold means for controlling the communication of said source with said lines, each valve means including a part movable in response to pressure in the related line and operable to control said pressure, a pivoted beam operatively connected with each valve part and operable to balance its respective part against said pressure in the line, weight carrying means movable along each beam, the weights initially supplied to the carrying means serving to establish a given ratio between the pressures supplied to the lines, and means for simultaneously moving said carrying means along their beams to vary said pressures while preserving said ratio including screw threaded shafts for moving said carrying means, gear means for rotating the shafts, and manual operating means for the gear means.

13. In a system for controlling the delivery of fluid pressure to a plurality of lines the combination of, a source of fluid pressure, a valve means for each line operable to control the pressure supplied thereto from said source, each valve means including a part urged in one direction by the fluid pressure from said source and movable to vary the pressure supplied to the related line, adjustable lever means for moving said parts in the other direction and operable to give said part of each valve an initial setting, and means for simultaneously moving said parts of the valves to vary the pressures supplied to the lines, while maintaining the given ratio between the pressures provided at said lines as determined by said initial settings of said parts, the last named means including a single manually operable control part mechanically operatively connected with the several lever means.

JOHN S. EDISON.

REFERENCES CITED

The following references are of record in the file of this patent:

UNITED STATES PATENTS

| Number | Name | Date |
|--------|------|------|
| 521,315 | Hoffman | June 12, 1894 |
| 1,012,288 | Stephenson | Dec. 19, 1911 |
| 1,632,618 | Moreley | June 14, 1927 |
| 1,831,089 | Barrett | Nov. 10, 1931 |
| 1,972,852 | Albright | Sept. 11, 1934 |
| 2,064,864 | Temple | Dec. 22, 1936 |
| 2,099,443 | Kraft | Nov. 16, 1937 |
| 2,172,931 | Maglott | Sept. 12, 1939 |
| 2,312,726 | Munro | Mar. 2, 1943 |